United States Patent
Godala et al.

(10) Patent No.: US 11,431,402 B2
(45) Date of Patent: Aug. 30, 2022

(54) METHODS AND SYSTEMS FOR REDUCING BEAM SEARCH SPACE FOR SELECTION OF AN OPTIMAL BEAM

(71) Applicant: Samsung Electronics Co., Ltd., Gyeonggi-do (KR)

(72) Inventors: Anirudh Reddy Godala, Bangalore (IN); Ashok Kumar Reddy Chavva, Bangalore (IN)

(73) Assignee: Samsung Electronics Co., Ltd

( * ) Notice: Subject to any disclaimer, the term of this patent is extended or adjusted under 35 U.S.C. 154(b) by 24 days.

(21) Appl. No.: 17/034,770

(22) Filed: Sep. 28, 2020

(65) Prior Publication Data

US 2021/0105061 A1    Apr. 8, 2021

(30) Foreign Application Priority Data

Oct. 3, 2019    (IN) ........................ 201941039947 PS
Jul. 9, 2020    (IN) ........................ 201941039947 CS

(51) Int. Cl.
*H04B 7/08*    (2006.01)
*H04B 7/06*    (2006.01)

(52) U.S. Cl.
CPC ........... *H04B 7/088* (2013.01); *H04B 7/0617* (2013.01)

(58) Field of Classification Search
CPC .... H04B 7/088; H04B 7/0617; H04B 7/0695; H04W 4/023; H04W 48/16; H04W 64/00; H04W 4/02; H04W 84/12; H04W 48/20; H04W 88/06; H04W 52/0254; H04W 48/18; H04W 4/80; H04W 64/003;
(Continued)

(56) References Cited

U.S. PATENT DOCUMENTS

| | | | |
|---|---|---|---|
| 2007/0281074 A1* | 12/2007 | Wang | ..................... B05B 12/00 427/8 |
| 2014/0243013 A1* | 8/2014 | Liu | ..................... H04W 64/003 455/456.1 |
| 2014/0334564 A1 | 11/2014 | Singh et al. | |

(Continued)

FOREIGN PATENT DOCUMENTS

| | | |
|---|---|---|
| WO | WO 2016/172652 | 10/2016 |
| WO | WO 2017/196124 | 11/2017 |

OTHER PUBLICATIONS

International Search Report dated Dec. 30, 2020 issued in counterpart application No. PCT/KR2020/013089, 7 pages.

(Continued)

*Primary Examiner* — Fred A Casca
(74) *Attorney, Agent, or Firm* — The Farrell Law Firm, P.C.

(57) ABSTRACT

Disclosed is a method for determining beam search space by a user equipment (UE), including determining a geo-location of a base station and a geo-location of the UE at a current time instance, determining a relative angle of reception from the base station based on the geo-location of the base station and the geo-location of the UE at the current time instance, determining a beam search space comprising a plurality of beams, for measurement, centered at the relative angle of reception, and determining an optimal beam from within the beam search space based on the measurement of the plurality of beams in the beam search space.

18 Claims, 17 Drawing Sheets

(58) Field of Classification Search
CPC ..... H04W 36/08; H04W 36/14; H04W 48/12; H04W 4/04; H04W 84/042
See application file for complete search history.

(56) References Cited

U.S. PATENT DOCUMENTS

| | | |
|---|---|---|
| 2016/0047884 A1 | 2/2016 | Zhang et al. |
| 2016/0165583 A1* | 6/2016 | Ho .................. H04B 7/0695 370/329 |
| 2017/0359106 A1* | 12/2017 | John Wilson ........ H04B 7/0408 |
| 2019/0037530 A1 | 1/2019 | Han et al. |
| 2019/0173558 A1 | 6/2019 | Nishikawa et al. |
| 2019/0245592 A1 | 8/2019 | Chae et al. |
| 2021/0036760 A1* | 2/2021 | Kim ...................... H04W 24/10 |
| 2021/0297139 A1* | 9/2021 | Kwon .................. H04B 7/088 |

OTHER PUBLICATIONS

Indian Examination Report dated Nov. 10, 2021 issued in counterpart application No. 201941039947, 6 pages.

* cited by examiner

METHODS AND SYSTEMS FOR REDUCING BEAM SEARCH SPACE FOR SELECTION OF AN OPTIMAL BEAM

CROSS-REFERENCE TO RELATED APPLICATION(S)

This application is based on and claims priority under 35 U.S.C. § 119(a) to Indian Provisional Patent Application Serial No. 201941039947 (PS), filed on Oct. 3, 2019, in the Indian Intellectual Property Office, and to Indian Complete Patent Application Serial No. 201941039947 (CS), filed on Jul. 9, 2020, in the Indian Intellectual Property Office, the disclosures of which are incorporated herein by reference in their entireties.

BACKGROUND

1. Field

The disclosure relates generally to beam selection in $5^{th}$ generation (5G) communication systems, and more particularly, to methods and systems for reducing beam search space at a user equipment (UE) during the process of selecting optimal beams for reception of signals from a next generation node B (gNB).

2. Description of Related Art

In beam forming systems (such as new radio (NR)), beam measurement is one of the key procedures performed by a UE. That is, the UE can perform the beam measurement by reference signal received power (RSRP) measurement using reference signals transmitted by a gNB (also referred to herein as a base station), on a per beam basis, in order to select an optimal serving beam. Transmission or reception using the optimal beam enables achieving a high throughput. However, the beam measurement procedure can be expensive, particularly in terms of computational overhead and power consumption. The expense is compounded in scenarios where the UE is in motion with respect to the base station and needs to frequently perform beam switching.

The orientation of the UE is likely to change during beam measurement. In that circumstance, the UE is likely to skip beam measurement of at least one beam, based on the degree of change in the UE orientation. This can result in a beam scheduling error, which may lead to repetition of beam measurement for at least one beam. Beam scheduling error can lead to inaccuracy in procedures such as determination of optimal beam and channel estimation based on a degree of correlation between different beam measurements.

FIGS. 1A, 1B and 1C illustrate errors in the beam measurement scheduling due to a change in the orientation of the UE, according to the prior art. As illustrated in FIG. 1A, consider at time $t_0$, the UE orientation is 0°. By the time $t_1$, the angular coverage is $\theta$°. During the time interval, the UE may measure at least one beam, based on the beamwidth of the at least one beam. As illustrated in FIG. 1B, the orientation of the UE is changed by $\delta$°. The UE, unaware of the change in its orientation, is likely to continue the beam measurement procedure. The UE can perform beam measurements, covering the beams spanning the remaining 360-$\theta$°. However, the actual angular coverage is $(\theta+\delta)$° to $(360-\theta-\delta)$°. As illustrated in FIG. 1C, the UE has performed measurements pertaining to the at least one beam, spanning an angular region of 0°-0°, twice. The UE had also missed beam measurement pertaining to at least one beam spanning an angular region (Missed Angular coverage) of $\delta$°-$(\theta+\delta)$°.

The discontinuous reception (DRX) cycle enables the UE to save power, expedited due to physical downlink control channel (PDCCH) monitoring in a radio resource control (RRC) CONNECTED state, during the ON periods of the DRX cycle. The UE needs to schedule channel state information-reference signal (CSI-RS) resource measurement instances during the OFF periods of the DRX cycle, if the number of transmission configuration indicator (TCI) states is large. As beam measurements need to be performed during the OFF periods of the DRX cycle, the UE may not be able to optimize power consumption.

FIG. 2 illustrates when the UE is unable to optimize power consumption due to beam measurement during the OFF periods of the DRX cycle, according to the prior art. As illustrated in FIG. 2, the UE has scheduled CSI-RS measurement instances during the OFF periods of the DRX cycle. The UE performs beam measurement during the OFF periods of the DRX cycle. The current consumption of the UE during the ON period is $i_1$ and the current consumption when the UE is in the partial ON state for beam measurements is $i_2$. The additional power consumed due to beam measurements is $\int i2 \, dt$.

As such, there is a need in the art for a method and system in which a beam search space is reduced in a UE, to lessen power consumption and increase cost effectiveness in 5G communication systems.

SUMMARY

The disclosure is provided to address at least the above-mentioned problems and/or disadvantages and to provide at least the advantages described below.

Accordingly, an aspect of the disclosure is to provide methods and systems for reducing UE beam search space for determining an optimal beam to receive signals from a gNB, such that the optimal beam is determined within the reduced beam search space based on a direction of reception of signals at the UE and a geo-location of the gNB.

Another aspect of the disclosure is to activate millimeter wave (mmWave) panels, whose beams are pointed towards the gNB, based on the current orientation of the UE and the geo-location of the gNB, wherein the optimal beam is determined from within a beam search space comprising beams in the activated mmWave panels.

Another aspect of the disclosure is to request an external source (such as a cloud or a server) to provide a geo-location of the gNB (in the serving cell) and geo-locations of gNBs in neighbor cells; by sharing geo-location of the UE, serving cell-ID and signage information pertaining to the UE.

Another aspect of the disclosure is to send the determined geo-location of the gNB and the signage information to the external source that can receive a plurality of geo-locations of the gNB and signage information from the plurality of UEs.

Another aspect of the disclosure is to request a plurality of UEs to provide geo-locations of the plurality of UEs and directions of beam reception.

Another aspect of the disclosure is to allow dynamic scheduling of beam measurements instances during ON periods of a DRX cycle and time periods close to the ON periods, to reduce power consumption of the UE.

Another aspect of the disclosure is to utilize neighboring cell measurements to determine the geo-location of a gNB in the neighboring cell, wherein the UE can determine an optimal beam for receiving signals from the gNB in the neighboring cell based on the neighboring cell measurements.

Another aspect of the disclosure is to consider changes in the orientation of the UE for scheduling beam measurements dynamically, in order to ensure that all beams in the reduced beam search space, encompassing an angular domain within the 360° angular domain, are measured.

Another aspect of the disclosure is to request an external source, using a long term evolution (LTE) connection, to provide the geo-location of the gNB.

In accordance with an aspect of the disclosure, a method for determining beam search space by a user equipment (UE) includes determining a geo-location of a base station and a geo-location of the UE at a current time instance, determining a relative angle of reception from the base station based on the geo-location of the base station and the geo-location of the UE at the current time instance, determining a beam search space comprising a plurality of beams, for measurement, centered at the relative angle of reception, and determining an optimal beam from within the beam search space based on the measurement of the plurality of beams in the beam search space.

In accordance with another aspect of the disclosure, a UE for determining beam search space includes a communication interface, and a processor coupled to the communication interface, wherein the processor is configured to, determine a geo-location of a base station and a geo-location of the UE at a current time instance, determine a relative angle of reception from the base station based on the geo-location of the base station and the geo-location of the UE at the current time instance, determine a beam search space, comprising a plurality of beams, wherein the beam search space is centered at the relative angle of reception, and determine an optimal beam from within the beam search space based on measurement of the plurality of beams in the beam search space.

BRIEF DESCRIPTION OF THE DRAWINGS

The above and other aspects, features and advantages of certain embodiments of the disclosure will be more apparent from the following detailed description, taken in conjunction with the accompanying drawings, in which the same or similar reference symbols may be used to refer to the same or like parts, and in which.

DETAILED DESCRIPTION

Figure 1A:
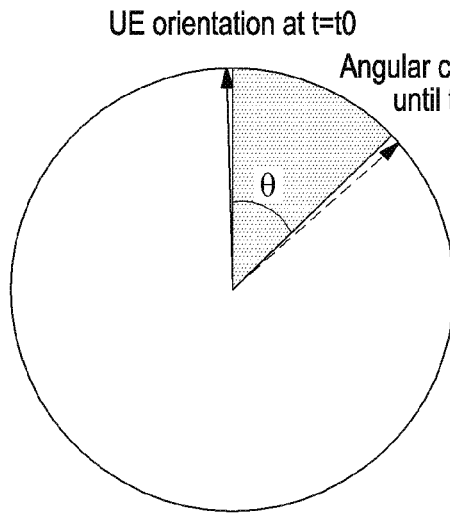
FIGS. 1A, 1B and 1C illustrate beam measurement scheduling error due to change in a UE orientation, according to the prior art.
Figure 1B:
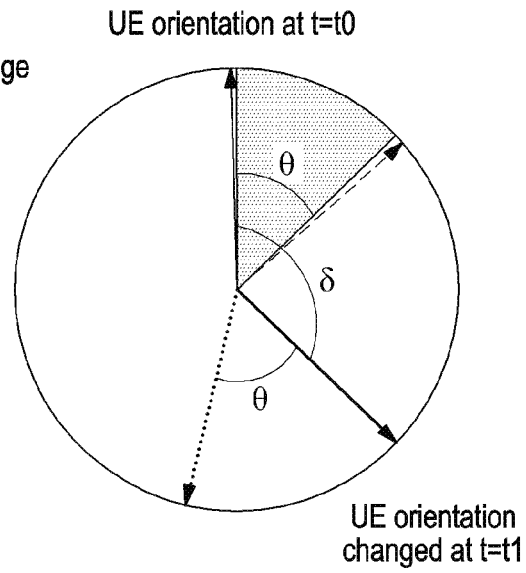
Figure 1C:
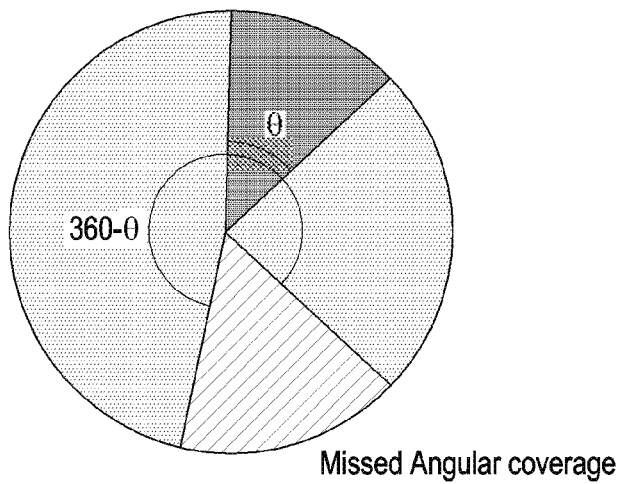
Figure 2:
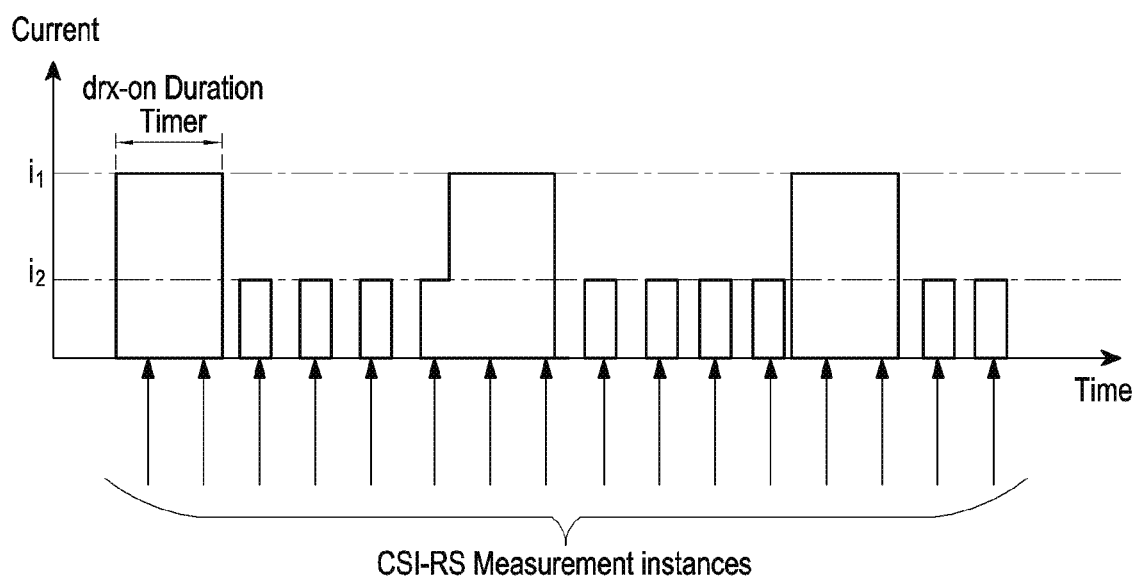
FIG. 2 illustrates when the UE is unable to optimize power consumption due to beam measurement during the OFF periods of the DRX cycle, according to the prior art.

Hereinafter, embodiments will be described in detail with reference to the accompanying drawings. Although specific embodiments are illustrated in the drawings and described in detail with reference thereto, this is not to limit the embodiments to specific forms. Detailed descriptions of known functions and/or configurations will be omitted for the sake of clarity and conciseness.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve methods and systems for reducing beam search space, for enabling a UE to determine an optimal beam to receive signals from a gNB, wherein the optimal beam is determined within the reduced beam search space based on a determined direction of reception of signals at the UE and a geo-location of the gNB. The geo-location of the gNB can be determined based on directions of beam reception at a plurality of time instances and geo-locations of the UE at the plurality of time instances. The directions of beam reception can be determined based on beam measurements, wherein the orientation of the beam with the highest gain is considered as the direction of beam reception.

In the disclosure, the UE can request a cloud to provide the geo-location of the gNB (in the serving cell) and geo-locations of gNBs in neighbor cells by sharing geo-location of the UE, serving cell-ID and signage information pertaining to the UE. The UE, operating in a non-standalone (NSA) mode, can access the cloud using LTE. The UE requests the cloud to provide the geo-location of the gNB. The request includes geo-location of the UE and the signage information pertaining to the UE. The UE receives an RRC connection reconfiguration message from the LTE network, for 5G bearer activation. The UE can request a plurality of UEs to provide their respective geo-locations and directions of beam reception. The UE can determine the geo-location of the gNB based on the received geo-locations of the plurality of UEs and directions of beam reception. The UE can send the geo-location of the gNB to the plurality of UEs.

The UE can use neighboring cell measurements for determining the geo-location of a gNB in a neighboring cell. The UE determines an optimal beam for reception from the gNB in the neighboring cell based on the neighboring cell measurements. The geo-location of the gNB 5 in the neighboring cell is determined based on directions of reception through the optimal beam at a plurality of time instances and geo-locations of the UE at the plurality of time instances.

The UE can schedule beam measurements instances during ON periods of a DRX cycle to save power. If all beams in the reduced beam search space cannot be measured within the ON periods, the UE can schedule the beam measurements instances close to the ON periods, which are likely to be extent, in an event of PDCCH reception. The UE can consider changes in the orientation of the UE for scheduling beam measurements dynamically, in order to ensure that all beams in the reduced beam search space are measured.

FIGS. 3A, 3B, 3C and 3D illustrate example determinations of geo-location of a gNB, by a UE, based on geo-locations of the UE at different time instances, according to an embodiment. In beamforming systems such as NR, both transmitters and receivers may have multiple beams, out of which the optimal beam on each of the transmitter and receiver is used for communication. Each of the beams is characterized by a direction 'θ', along which gain is maximum for a received or transmitted signal. Hence, during signal reception, the UE can estimate the optimal beam for each of the transmitter and receiver and utilize the optimal beams for setting up communication with the gNB.

Figure 3A:
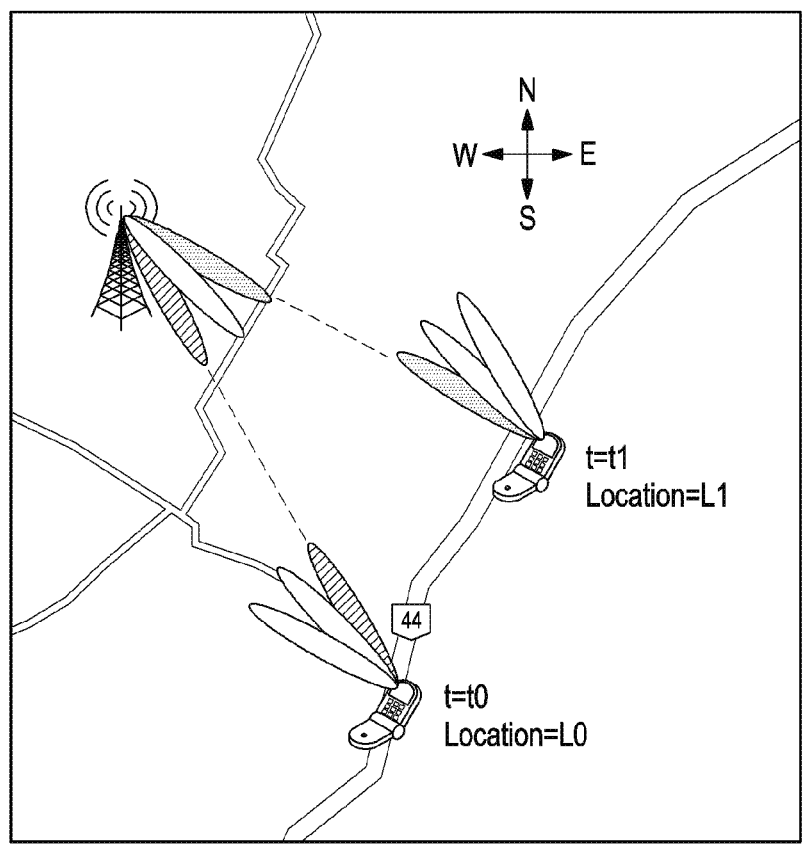
FIGS. 3A, 3B, 3C and 3D illustrate an example determination of geo-location of a gNB, by a UE, based on geo-locations of the UE at different time instances, according an embodiment.

Consider that there is line-of-sight communication between the UE and the gNB. As illustrated in FIG. 3A, consider that at a time instant to, the UE is located at L0. The geo-spatial coordinates at L0 is X0° N, Y0° E. The geospatial coordinates can be determined using at least one of a geo-spatial sensor (which uses at least one of a global positioning system (GPS), Galileo, global navigation satellite system (GLONASS), Beidou, Michibiki, and NavIC to determine geo-spatial co-ordinates), triangulation, and wireless-fidelity (Wi-Fi). The direction of beam reception is α°, with respect to North. The direction of beam reception can be determined using at least one orientation sensor present in the UE. At a time instant $t_1$, the geo-location of the UE is L1. The geospatial coordinates at L1 are X1° N, Y1° E. The direction of beam reception is β°, with respect to North.

Embodiments herein determine the geospatial coordinates of the gNB and reduce beam search space using the gNB co-ordinates.

Figure 3B:
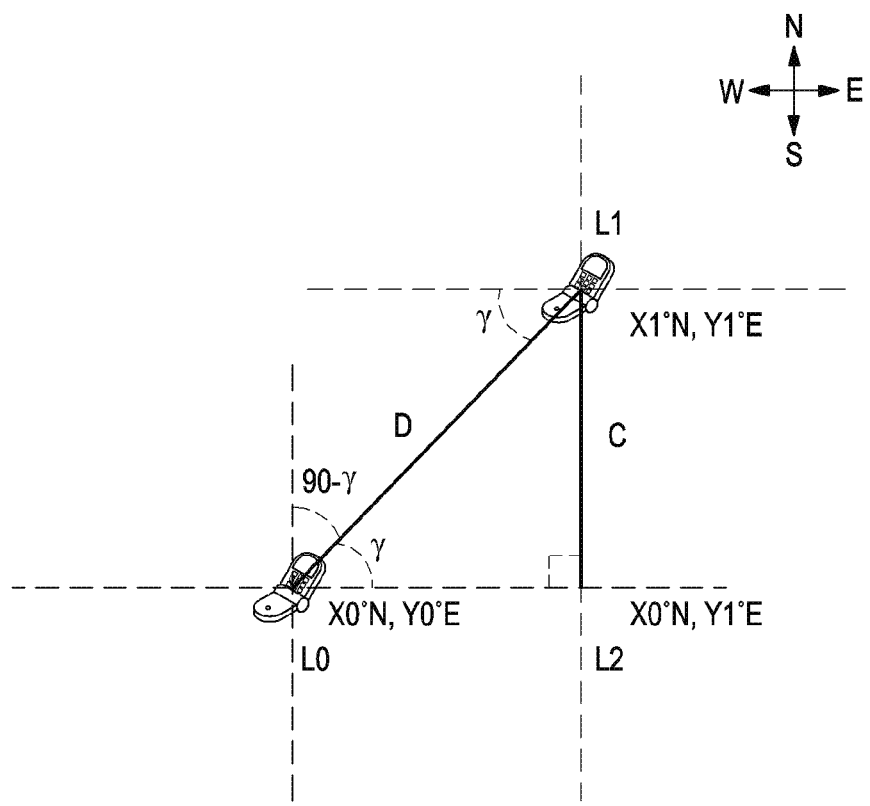

As illustrated in FIG. 3B, the UE can determine the distance between L0 and L1, which are the geo-locations of the UE at time instances to and $t_1$. Consider that the distance between the locations L0 and L1 is determined to be D. The UE can determine the geospatial coordinates at a location L2 based on the geospatial coordinates of L0 and L1. There is no change in longitude between the locations L1 and L2.

Similarly, there is no latitude change in the locations L0 and L2. Therefore, the geospatial coordinates at L2 are X0° N, Y1° E.

Consider that the distance between the locations L2 and L1 is determined to be C. The locations L0, L1, and L2 form a right triangle. Using trigonometry, the direction of movement of the UE, with respect to North, will be γ, which is $\sin^{-1}(C/D)$.

Figure 3C:
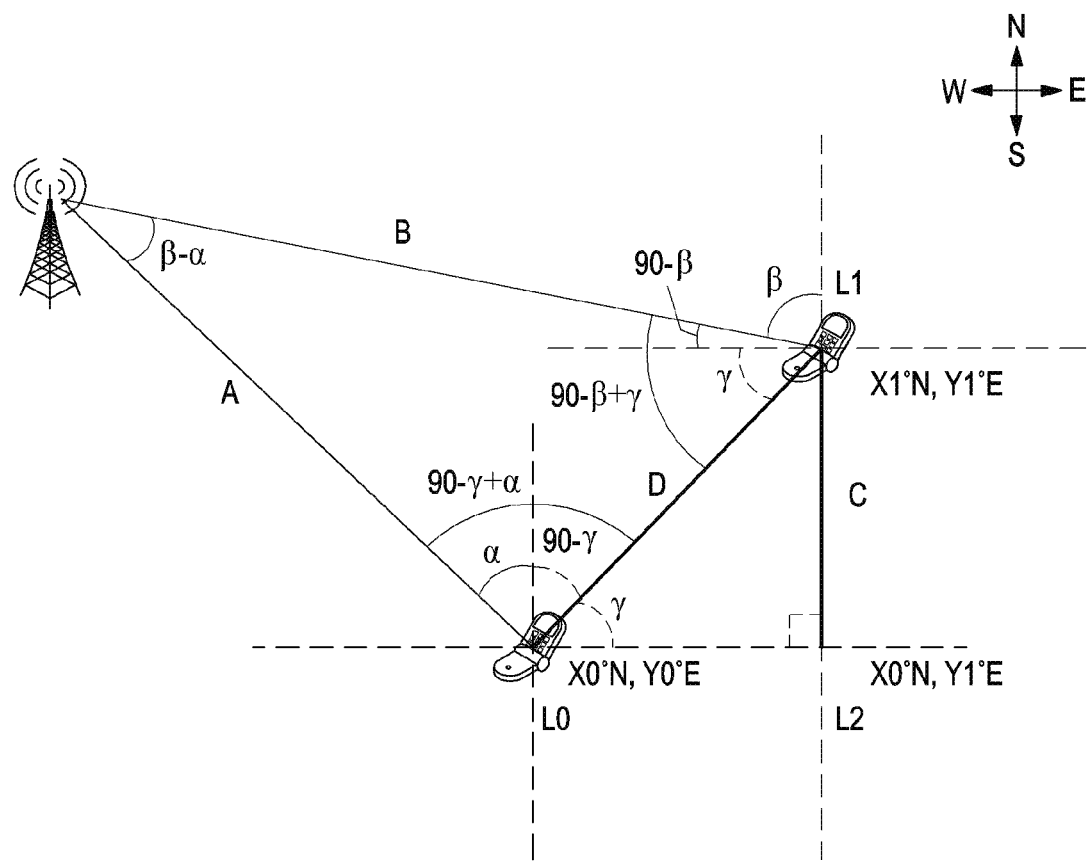

As illustrated in FIG. 3C, the distance between the UE and the gNB at the time instances $t_0$ and $t_1$, at locations L0 and L1 respectively, can be determined using the triangulation principle. A triangle can be constructed using the two positions of the UE and the position of the gNB.

The embodiments include determining the geospatial coordinates of the gNB using the triangulation principle. Consider that the distance between the location L0 and the gNB is A. Consider that the distance between the location L and the gNB is B. The sides of the triangle (constructed by joining the geo-locations of the UE, i.e., L0 and L1, and the position of the gNB) are A, B, and D. The angles between the sides of the triangle are β-α, 90-γ+α, 90-β+γ.

Applying sine rule, the following Equation (1) is obtained, $$\frac{A}{\sin(90-\beta+\gamma)} = \frac{B}{\sin(90-\gamma+\alpha)} = \frac{D}{\sin(\beta-\alpha)} \quad (1)$$

The embodiments include computing values of A and B using Equation (1). Once the values of A and B are computed, the geospatial coordinates of the gNB can be determined. Consider that the geospatial coordinates of the gNB are X° N, Y° E.

Figure 3D:
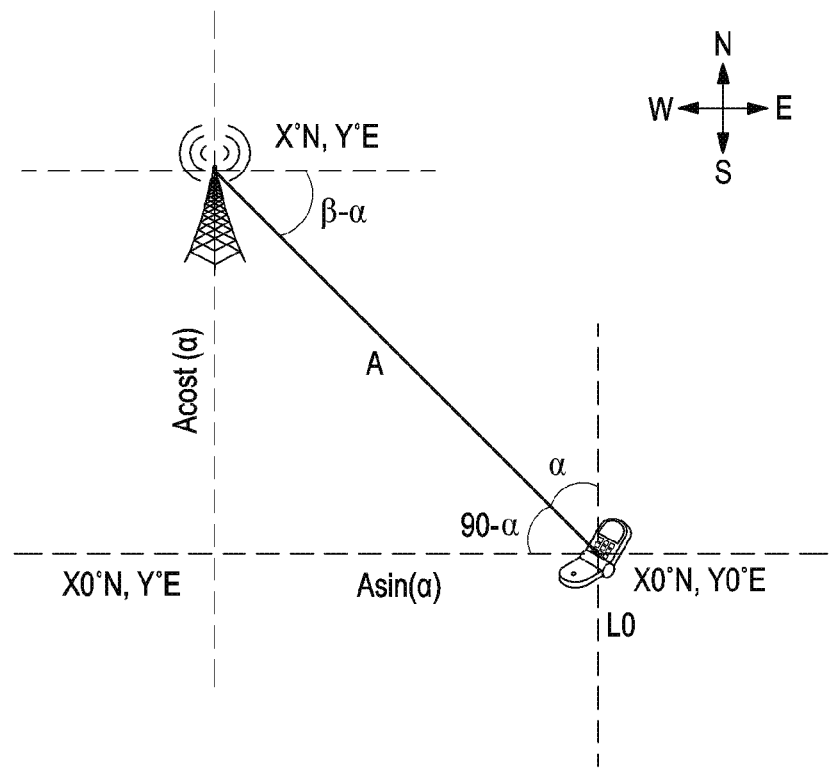

As illustrated in FIG. 3D, a right triangle can be constructed by joining the geo-location of the UE, L0, supposed geo-location of the gNB, and a point of reference, determined based on the geo-location of the UE and the supposed geo-location of the gNB. The sides of the triangle are of lengths A, A sin(α), and A cos(α).

Each second change in longitude corresponds to a distance of approximately 30.1 m. The change in longitude between the geospatial coordinates of the gNB and the geo-spatial coordinates of the UE at L0 is A sin(α). The value of Y can be determined based on the change of longitude. Therefore, the value of Y can be obtained by accumulating a number of seconds required for covering a distance A sin(α) with Y0.

Similarly, each second change in latitude corresponds to a distance of approximately 30.9 m. The change in latitude between the geospatial coordinates of the gNB and the geo-spatial coordinates of the UE at L0 is A cos(α). The value of X can be determined based on the change of latitude. Therefore, a number of seconds required for covering a distance A cos(α) is accumulated with X0 to obtain the value of X.

Similarly, a triangle can be considered by joining the geo-location of the UE, L1, supposed geo-location of the gNB, and another point of reference. In this scenario, the sides of the triangle can be of lengths B, B sin(β), and B cos(β). The values of X and Y can be obtained based on the distances between the UE and the gNB. The geospatial coordinates of the gNB are obtained once the values of X and Y have been determined.

The UE can determine a geospatial coordinate of the gNB corresponding to a geo-location of the UE. In this example, as two geo-locations of the UE, i.e., L0 and L1, are considered, two geospatial coordinates have been obtained. A centroid of the values of the geospatial coordinates can be computed to determine actual geospatial coordinates of the gNB.

The geospatial coordinates of the gNB can be known and communicated to the UE by the gNB itself or any other part of the network.

Figure 4:
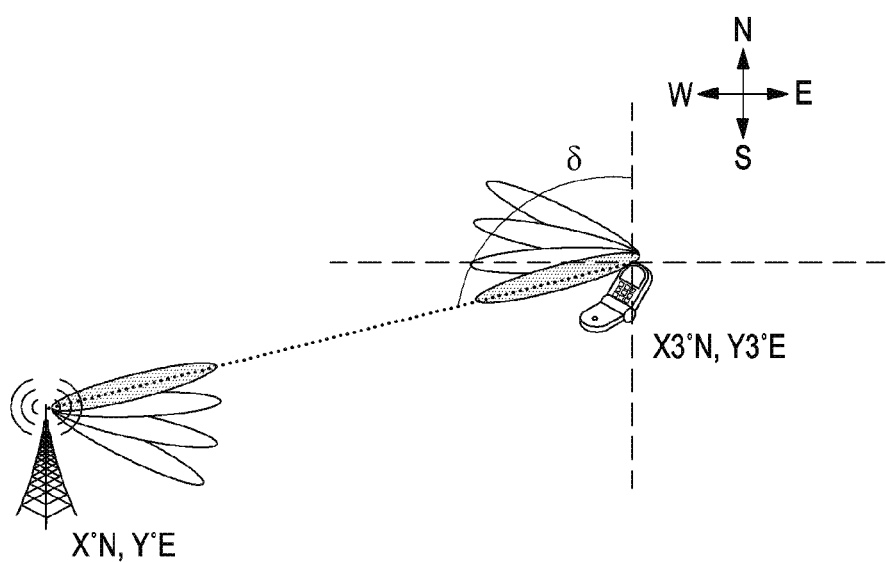
FIG. 4 illustrates an example scenario of determining a beam search space for determining an optimal beam, based on a direction of beam reception and geo-locations of the UE and the gNB, according an embodiment.

FIG. 4 illustrates an example scenario of determining a beam search space for determining an optimal beam, based on a direction of beam reception and geo-locations of the UE and the gNB, according an embodiment. Consider that geospatial coordinates of the current geo-location of the UE are X3° N, Y3° E. The geospatial coordinates of the geo-location of the gNB have been determined as X° N, Y° E. Based on the technique illustrated in FIG. 3B, a relative angle $\delta$ of reception from the gNB, can be determined using the distance between the gNB and the UE at a current time instant. The relative angle $\delta$ is in terms of the global coordinate system (GCS). The relative angle can be converted to $\delta'$, which is in terms of the local coordinate system (LCS) with respect to the UE. The conversion of $\delta$ to $\delta'$ is based on the orientation of the UE. Thus $\delta'$ is a function of $\delta$ and orientation of the UE.

Consider that $\varphi$ is an offset angle, which can be adapted based on speed and direction of movement of the UE. The beam measurements can be performed for beams within the angles $\delta'$-$\varphi$ and $\delta'$+$\varphi$, where $\varphi$ is the offset angle. The optimal beam for reception can be situated at an angle $\delta'$ or between angles $\delta'$-$\varphi$ and $\delta'$+$\varphi$.

Figure 5:
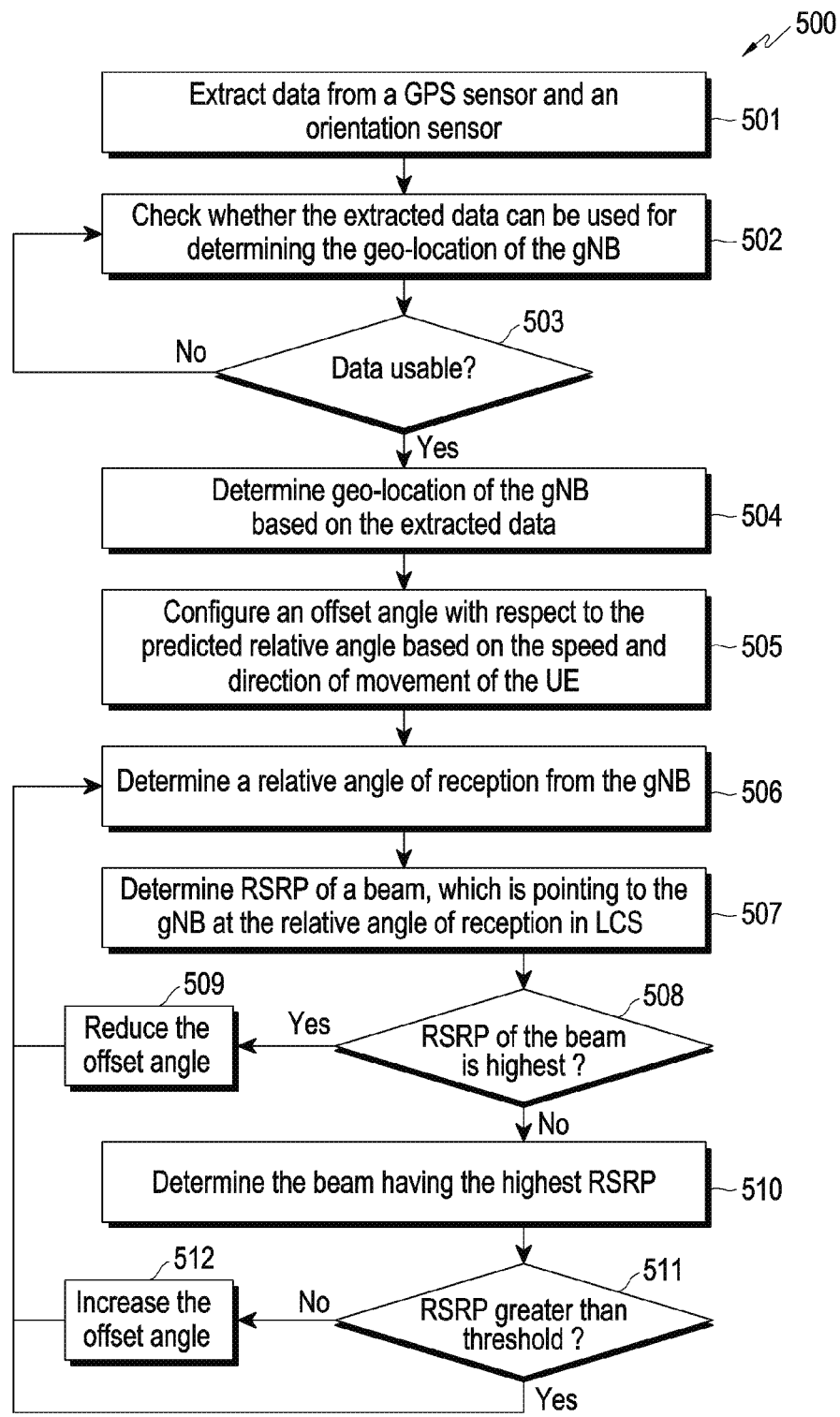
FIG. 5 illustrates a method for reducing the UE beam search space for determining an optimal beam for reception of signals from the gNB, according an embodiment.

FIG. 5 illustrates a method for reducing the UE beam search space for determining an optimal beam for reception of signals from the gNB, according an embodiment.

At step 501, data is extracted from a geospatial sensor and an orientation sensor. The geo-location of the UE is determined from the geospatial sensor. The geospatial sensor provides the geospatial coordinates of the geo-location (L0 or L1) of the UE. A direction of beam reception is determined by the UE ($\alpha$ or $\beta$) from the orientation sensor.

At step 502, it is determined whether the extracted data can be used for determining the geo-location of the gNB. If the geo-location of the gNB cannot be determined from the extracted data, at step 503, the extraction of data from the geospatial sensor and the orientation sensor can continue, until the extracted data can be used for determining the geo-location of the gNB. For example, if the UE is stationary or if the directions of beam reception ($\alpha$ and $\beta$) at different time instances are found to be 0°, the extracted data cannot be used for determining the geo-location of the gNB.

If it is determined, at step 503, that the extracted data can be used for determining geo-location of the gNB (i.e., the UE is not stationary and the directions of beam reception are non-zero), the method includes, at step 504, determining the geo-location of the gNB. The embodiments include determining the distance between the UE and the gNB based on the data extracted from the geospatial sensor (geospatial coordinates of the UE) and an orientation sensor (direction of beam reception).

An amount of change in each of the longitude and latitude is determined, with respect to the geo-location of the UE, based on the distance between the UE and the gNB. The geo-location of the gNB can be determined by aggregating the change in longitude and latitude with the geospatial coordinates of the UE for determining the geospatial coordinates of the gNB.

At step 505, the method includes configuring an offset angle (<p) by selecting an initial value based on the speed and direction of movement of the UE. The initial value is updated, if the RSRP associated with a beam (which has been determined as the optimal beam) is less than a predefined threshold.

At step 506, the relative angle of reception from the gNB is determined based on the distance between the UE and the gNB, and geospatial coordinates of the UE and the gNB. The determined value of the relative angle is in terms of GCS. The relative angle is converted in terms of LCS ($\delta'$) (at the UE) based on the orientation of the UE.

The beams that are pointing to the gNB at an angle in a range $\delta'$±$\varphi$ in the azimuth and 0-180° in the zenith, are included in the beam search space. The UE can perform measurement of the beams in the beam search space. Thus, the beam search space is reduced from 360° to 2$\varphi$° in the XY plane, wherein the center of the beam search space is $\delta'$ in the XY Plane.

At step 507, the RSRP of a beam, which is pointing to the gNB at an angle $\delta'^\circ$, is determined. The measurement includes determining the RSRPs of all beams in the beam search space 2$\varphi$°. The beams in the beam search space are measured.

At step 508, it is determined whether the beam has the highest RSRP. If it is determined that the optimal beam has the highest RSRP, at step 509, the offset angle is reduced. Once the offset angle is reduced, the method returns to step 506 to re-determine the relative angle of reception from the gNB. The beam that is pointing to the gNB at an angle $\delta'^\circ$, can be considered as the optimal beam.

If it is determined at step 508 that the optimal beam does not have the highest RSRP, at step 510, a beam is determined, in the beam search space, which has the highest RSRP. At step 511, it is determined whether the RSRP of the beam having the highest RSRP is greater than (or 'greater than or equal to') a threshold RSRP value. If it is determined, at step 511, that the RSRP of the beam having the highest RSRP is greater than (or 'greater than or equal to') the threshold RSRP value, the beam having the highest RSRP is considered as the optimal beam and the method returns to step 506.

If it is determined, at step 511, that the RSRP of the beam, having the highest RSRP, is less than the threshold RSRP value, at step 512, the offset angle is increased. Once the offset angle is increased, the method returns to step 506 and re-determines the relative angle of reception from the gNB.

The method can continue to extract data from the geospatial sensor and the orientation sensor data at step 501, to re-determine the geo-location of the gNB. The re-determination enables increased accuracy of the geo-location of the gNB. The method continues to determine the geo-location of the gNB and reduce the beam search space, as long as the UE is connected to the gNB.

The steps in the flowchart 500 may be performed in the order presented, in a different order, or simultaneously. Some steps listed in FIG. 5 may be omitted.

Figure 6:
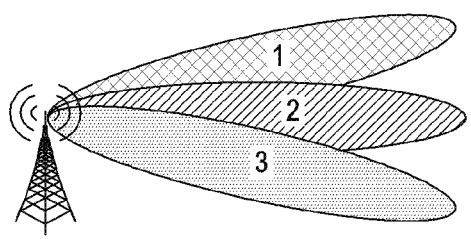
FIG. 6 illustrates selection of optimal beams for reception of signals from the gNB, according an embodiment.
Figure 6:
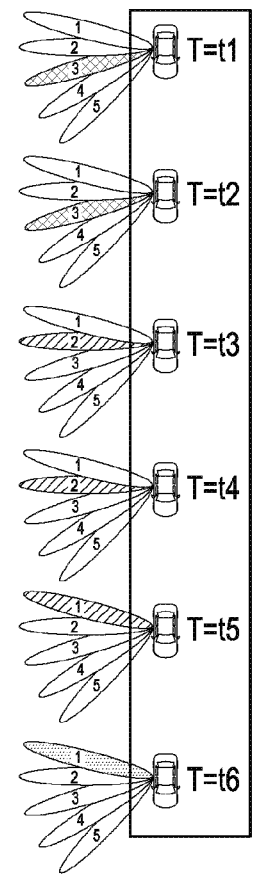

FIG. 6 illustrates selection of optimal beams for reception of signals from the gNB, according an embodiment.

As illustrated in FIG. 6, at different instances of time, the UE can select an optimal beam for reception from a beam search space. Initially, the UE can determine the geo-location of the gNB. Consider that the UE determines two geospatial coordinates, which indicate two geo-locations of the gNB. The first geo-location can be obtained based on geo-locations of the UE at time instances $t_1$, and $t_2$. The second geo-location can be obtained based on geo-locations of the UE at time instances $t_2$, and $t_3$. The geo-location of the gNB can be determined by computing a centroid of the first geo-location and the second geo-location.

Thereafter, the UE can update the beam search space at different time instances after the time instant $t_3$, as long as the UE is connected to the gNB. While updating the beam search space and performing beam measurements, the UE can continue to improve the accuracy of the geo-location of the gNB by determining geo-locations (geospatial coordinates) of the gNB at a plurality of time instances. The UE can obtain a centroid of the different geo-locations of the gNB, determined based on the geo-locations of the UE at the plurality of time instances.

Figure 7:
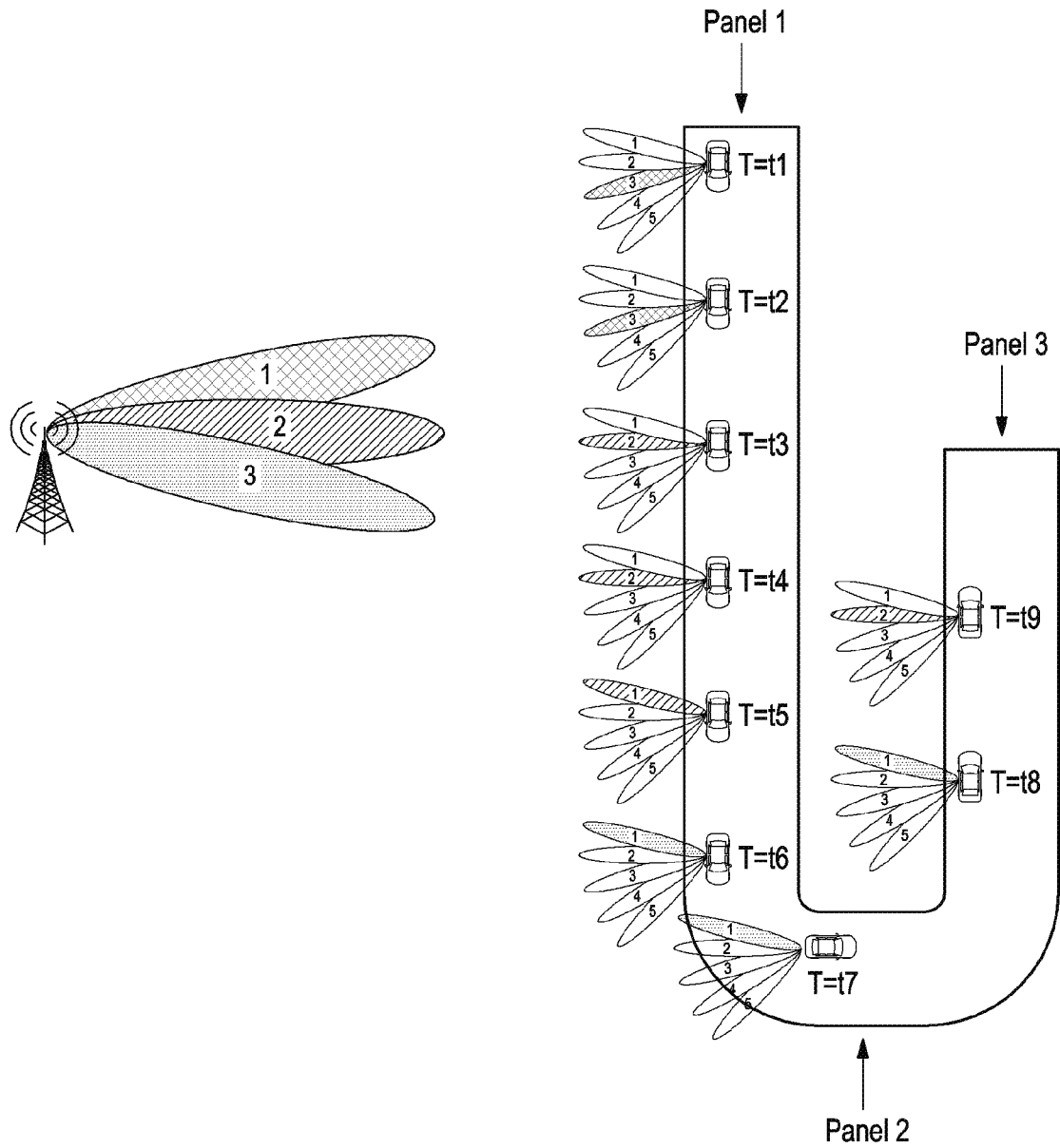
FIG. 7 illustrates selection of beams for reception of signals from a gNB, wherein the beams are selected by activating different mmWave panels of the UE, according an embodiment.

FIG. 7 illustrates selection of beams for reception of signals from a gNB, wherein the beams are selected by activating different mmWave panels of the UE, according an embodiment. Each of the mmWave panels can include an antenna module. Once the geo-location of the gNB has been determined, the UE can determine/update the beam search space for performing beam measurements. The UE can determine the RSRPs of the beams in the beam search space, in order to determine the optimal beam. However, if the relative angle between the UE and the gNB is such that none of the beams of an activated mmWave panel fall in the beam search space, then the UE can activate another mmWave panel based on the gNB geo-location and the relative angle between the UE and the gNB.

As illustrated in FIG. 7, at time instances $t_7$, $t_8$, and $t_9$, none of the beams of a first panel point to the gNB. This could be due to a change in orientation of the UE and/or location of the UE. The orientation of the UE and/or location of the UE at time $t_7$ are such that beams in a second mmWave panel and/or a third mmWave panel are pointing towards the beams of the gNB. The beam search space can be updated at time instances $t_7$, to include beams of the second and third mmWave panels.

Figure 8:
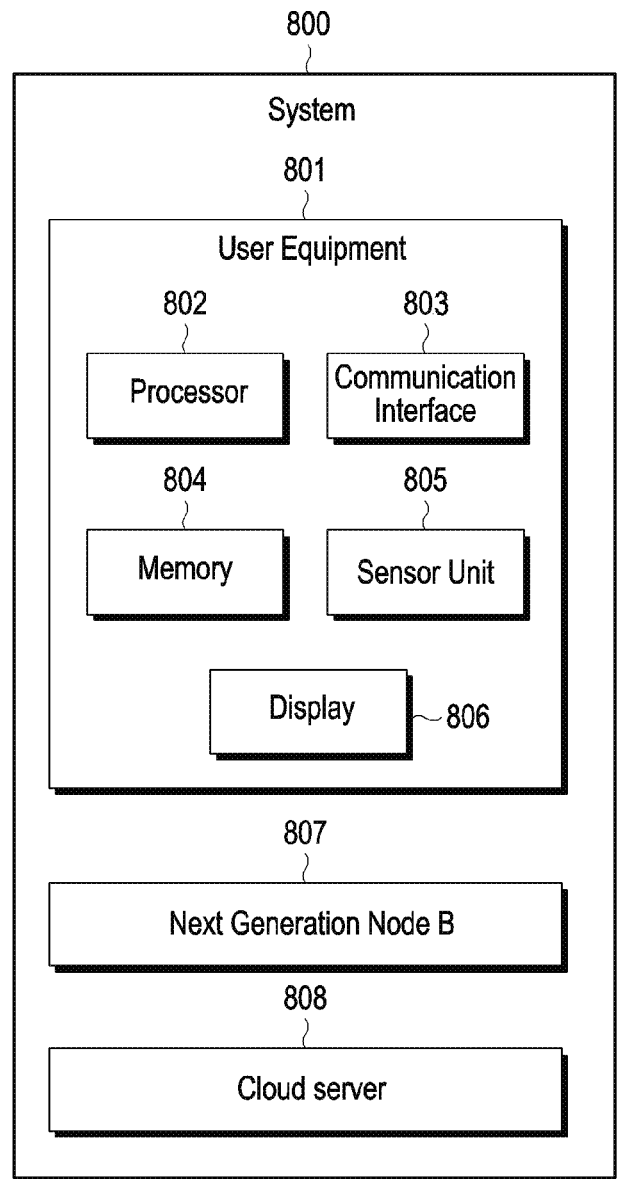
FIG. 8 illustrates various units of a system configured to reduce beam search space of a UE, in order to determine an optimal beam for receiving signals from a gNB, according an embodiment.

FIG. 8 illustrates various units of a system 800 configured to reduce beam search space of a UE 801, in order to determine an optimal beam for receiving signals from a gNB 807, according an embodiment.

As illustrated in FIG. 8, the system 800 includes the UE 801, the gNB 807 and the cloud server 808 (hereinafter, cloud). The UE 801 includes a processor 802, a communication interface 803, a memory 804, a sensor unit 805, and a display 806. The UE 801 can determine the geo-location of the gNB 807. Once the geo-location of the gNB 807 has been determined, the UE 801 can determine a relative angle of reception from the gNB 807. The UE 801 can set an offset angle based on the speed and direction of movement of the UE 801. The beam search space is centered at the determined relative angle and limited to the offset angle on either side of the determined relative angle. Thus, the beam search space is reduced to twice the offset angle. The UE 801 can determine an optimal beam for reception within the reduced beam search space. The sensor unit 805 can determine the first geo-location of the UE 801 at a first time instance. The sensor unit 805 comprises geospatial sensors and orientation sensors, which can determine the geospatial coordinates of the UE 801 and the orientation of the UE 801 at a particular time instant. The processor 802 can perform beam measurement, wherein the RSRP of all reception beams is determined. The processor 802 can determine a beam having the highest RSRP based on the beam measurement. The orientation sensors in the sensor unit 805 can determine a direction of beam reception, with respect to a beam having the highest RSRP. Similarly, the geospatial coordinates of the UE 801 and the direction of beam reception can be determined at a plurality of time instances.

The processor 802 can compute a distance between the first geo-location of the UE 801 and a second geo-location of the UE 801, at the first time instance and a second time instance, respectively. The processor 802 can compute a direction of movement of the UE 801, based on the distance between the first geo-location and the second geo-location of the UE 801, and geospatial coordinates of the first geo-location and a second geo-location of the UE 801.

The processor 802 can compute the distances between the UE 801 and the gNB 807 at the first and second time instances (at the first geo-location and the second geo-location of the UE 801, respectively). The sides of the triangle are the distance between the first geo-location of the UE 801 and a second geo-location of the UE 801, distance between the first geo-location of the UE 801 and the assumed position of the gNB 807, and distance between the second geo-location of the UE 801 and the assumed position of the gNB 807. The processor 802 can compute the distances between the UE 801 and the gNB 807 at the first and second time instances using sine rule in Equation (2) as follows (refer FIG. 3c):

$$\frac{A}{\sin(90-\beta+\gamma)} = \frac{B}{\sin(90-\gamma+\alpha)} = \frac{D}{\sin(\beta-\alpha)} \quad (2)$$

In Equation (2), A is the distance between the first geo-location of the UE 801 and the assumed position of the gNB 807, B is the distance between the second geo-location of the UE 801 and the assumed position of the gNB 807, γ is the direction of movement of the UE 801, α is the direction of beam reception at the first geo-location of the UE 801, and β is the direction of beam reception at the second geo-location of the UE 801.

Once computing the distance between the first geo-location of the UE 801 and the assumed position of the gNB 807, and computing the distance between the second geo-location of the UE 801 and the assumed position of the gNB 807, the processor 802 can compute geospatial coordinates of the gNB 807. The standard distances, corresponding to changes in longitude and latitude in seconds, can be scaled with respect to A cos(α) and A sin(α) (refer FIG. 3D). A first geospatial coordinate of the gNB 807, corresponding to the first geo-location of the UE 801, can be determined based on the scaled change in longitude and latitude in seconds and the geospatial coordinates of the first geo-location of the UE 801.

Similarly, standard distances, corresponding to changes in longitude and latitude in seconds, can be scaled with respect to B cos(β) and B sin(β). A second geospatial coordinate of the gNB 807, corresponding to the second geo-location of the UE 801, can be determined based on the scaled change in longitude and latitude in seconds and the geospatial coordinates of the second geo-location of the UE 801.

The processor 802 can compute a centroid of the first geospatial coordinate and the second geospatial coordinate to determine the actual geospatial coordinates of the gNB 807.

The processor 802 can determine the relative angle of reception from the gNB 807 in terms of GCS. The determined value of the relative angle can be converted into terms of LCS, with respect to the UE 801, based on the orientation of the UE 801. The processor 802 can determine the relative angle of reception based on the distance between the UE 801 and the gNB 807, current geospatial coordinates of the UE 801 and the geospatial coordinates of the gNB 807. The value of the relative angle of reception changes as the geo-location of the UE 801 changes.

The reduced beam search space is centered at the angle of reception (δ') in LCS. The processor 802 can include those beams in the beam search space, which are pointing towards the gNB 807 at an angle, in a range δ'±φ in the azimuth and 0-180° in the zenith (φ is the offset angle set by the UE 801). Thus, the beam search space is reduced from 360° to 2φ° in the XY plane, wherein the center of the beam search space is δ' in the XY plane.

The processor 802 can update the offset angle based on the speed and direction of movement of the UE 801. Initially, the processor 802 can consider the beam, which is pointing to the gNB 807 at an angle δ'°, as a first beam. The processor 802 can determine a beam having the highest RSRP in the reduced beam search space. If the first beam has the highest RSRP, the first beam is considered as the optimal beam. Thereafter, the processor 802 can reduce the offset angle.

If the RSRP of the first beam is not the highest RSRP, the processor 802 can determine the beam having the highest RSRP and consider this as a second beam. The processor 802 can determine whether the RSRP of the second beam is greater than (or 'greater than or equal to') a threshold RSRP value. If the RSRP of the second beam is greater than the threshold RSRP value, the second beam is considered as the optimal beam.

If the RSRP of the second beam is less than the threshold RSRP value, the processor 802 can increase the offset angle. Thereafter, the processor 802 can track the change in the value of the relative angle and re-determine the beam search space, to re-determine the optimal beam.

The UE 801 can receive PDCCH and physical downlink scheduling channel (PDSCH) through different reception beams. The processor 802 can determine the geo-location of the gNB 807 independently based on a PDCCH reception beam and a PDSCH reception beam. The direction of reception of PDCCH can be considered for determining a geo-location of the gNB 807 or another geo-location of the gNB 807. Thereafter, the processor 802 can independently track the direction of reception of PDCCH and PDSCH, which involves determining relative angles between the UE 801 and the gNB 807, for the PDCCH and PDSCH, respectively.

The processor 802 can determine the geo-location of gNB 807 independently based on a PDCCH reception beam and a PDSCH reception beam. Thereafter, the processor 802 can compute an angular offset angle (Θ), which is based on a difference between the relative angles between the UE 801 and the gNB 807, for PDCCH and PDSCH reception beams. The processor 802 can track changes in the relative angle, due to changes in the geo-location and orientation of the UE 801, between the UE 801 and the gNB 807, with respect to either of the PDCCH reception beam or the PDSCH reception beam.

Consider that the RSRP of the PDCCH reception beam is higher than the RSRP of the PDSCH reception beam. Therefore, the processor 802 can track changes in the relative angle between the UE 801 and the gNB 807, with respect to the PDCCH reception beam. The angular offset can be used for obtaining the direction of reception of the PDSCH beam (relative angle between the UE 801 and the gNB 807 with respect to the PDSCH reception beam). Over a period of time, 'Θ' can be updated based on location of the UE, and speed and direction of the UE 801 movement. For the reception of PDSCH, the processor 802 can apply the updated angular offset to determine the relative angle between the UE 801 and the gNB 807, with respect to the PDSCH reception beam.

If the RSRP of the PDSCH reception beam increases to greater than the RSRP of the PDSCH reception beam, then the processor 802 can track changes in the relative angle between the UE 801 and the gNB 807, with respect to the PDSCH reception beam. The angular offset can be used for obtaining the direction of reception of the PDCCH beam.

FIG. 8 illustrates units of the system 800, but it is to be understood that embodiments of the disclosure are not limited thereto. The system 800 may include fewer or additional units. The labels or names of the units are used only for illustrative purposes and do not limit the scope of the disclosure. One or more units can be combined together to perform same or substantially similar function in the system 800.

Figure 9:
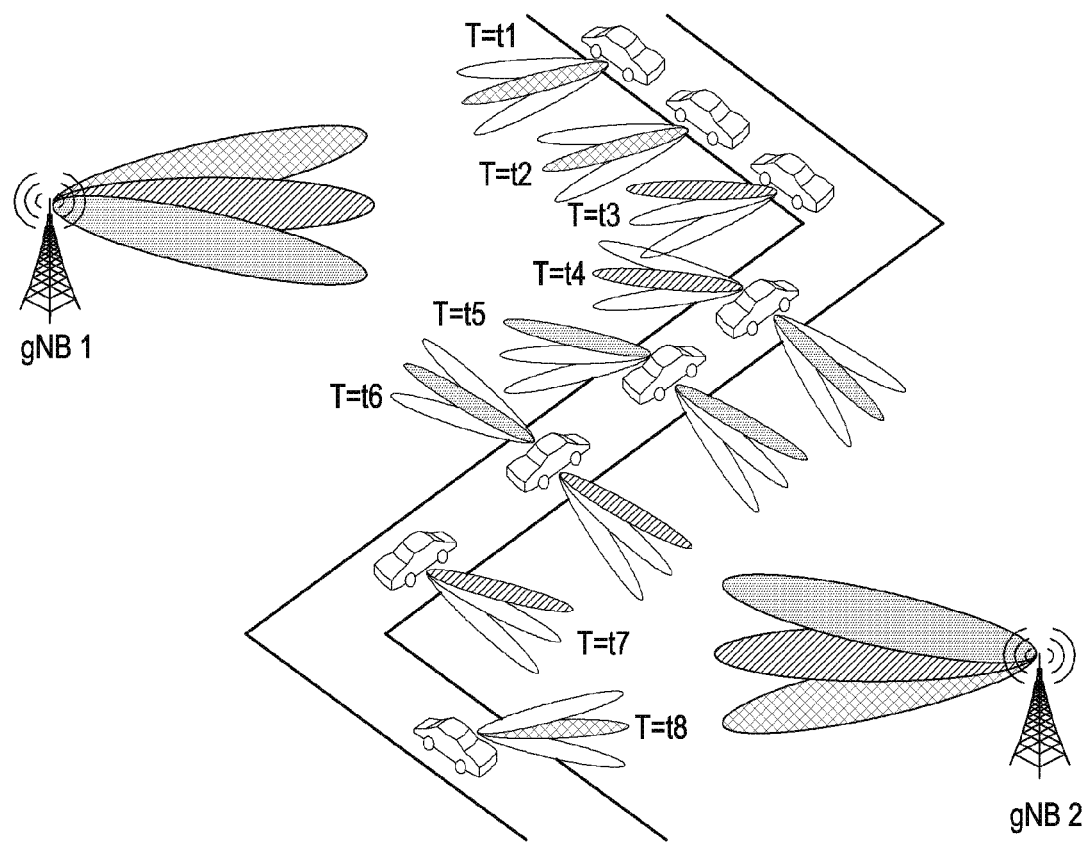
FIG. 9 illustrates swift handover, due to determination of geo-location of a neighboring cell gNB while being connected to a gNB in a serving cell, according an embodiment.

FIG. 9 illustrates swift handover, due to determination of geo-location of a neighboring cell gNB, while being connected to a gNB 807 in a serving cell, according an embodiment. The UE 801 can perform neighboring cell beam measurements for determining the geo-location of the neighboring cell gNB. The neighboring cell measurements involve determining the RSRP of beams, receiving synchronization signals from the neighboring cell gNB. At a particular time instant, the direction of reception of the synchronization signals through a reception beam, with respect to the neighboring cell gNB, having the highest RSRP, is determined using the orientation sensor of the UE 801. Similarly, the UE 801 can perform beam measurements at a plurality of time instants, to determine directions of reception of the synchronization signals through a plurality of reception beams.

The UE 801 can utilize the geo-locations of the UE 801 at the plurality of time instants (determined from geospatial sensors of the UE 801, and direction of reception at the plurality of time instants) for determining the geo-location of the neighboring cell gNB. The UE 801 can send the neighbor cell measurements to the serving cell gNB 807. When the UE 801 observes that quality of signals received from the neighboring cell gNB is better than the quality of the signals received from the serving cell gNB 807, the UE 801 can wait to receive a handover command message from the serving cell gNB 807.

Once the UE 801 receives the handover command message from the serving cell gNB 807, the UE 801 can perform RRC re-establishment procedure or attach procedure. As illustrated in FIG. 9, at time instances $t_1$, $t_2$, and $t_3$, the UE 801 is connected to gNB-1 (serving cell gNB 807) and receives commands from the gNB-1 to perform neighbor cell measurements. Accordingly, at time instances $t_4$, $t_5$, and $t_6$, the UE 801 performs neighbor cell beam measurements and determines the geo-location of the neighbor cell gNB, i.e., gNB-2.

At time $t_6$, the UE 801 sends a measurement report to gNB-1, stating that quality of signals received from gNB-2 is better than the quality of signals received from gNB-1. Based on the measurement report sent to gNB-1, the gNB-1 can send a handover command. At time $t_7$, the UE 801 can perform RRC re-establishment procedure or attach procedure. As the geo-location of gNB-2 has been determined, the UE 801 can determine a relative angle of the UE 801 with respect to gNB-2. The UE 801 can select an offset to determine a beam search space. The UE 801 can determine an optimal beam, for reception from the gNB-2, within the beam search space at time $t_8$.

Figure 10:
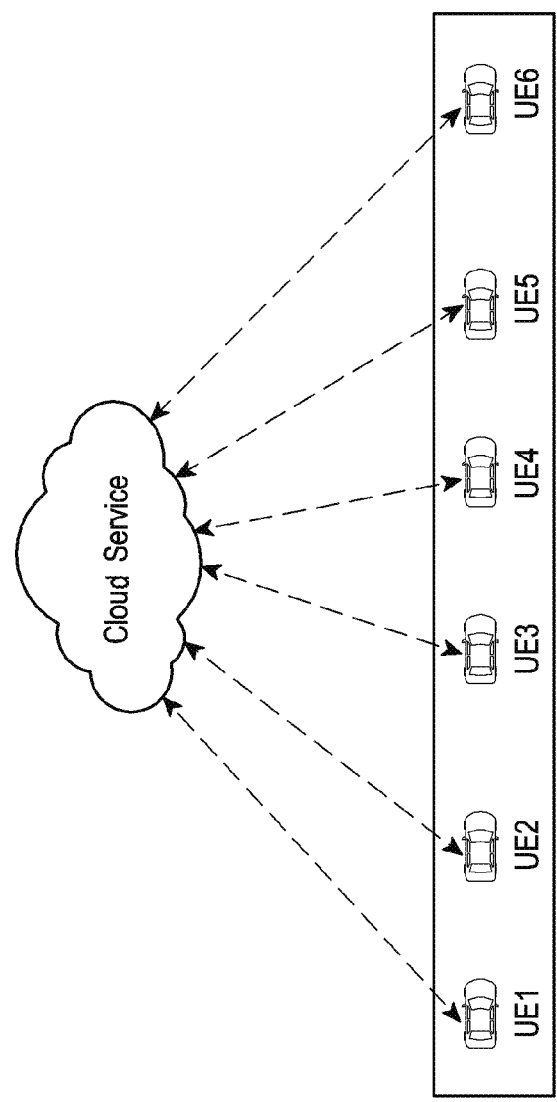
FIG. 10 is illustrates when a plurality of UEs can obtain the geo-location of a gNB using a cloud based service, according an embodiment.

FIG. 10 illustrates when a plurality of UEs can obtain the geo-location of a gNB using a cloud based service, according an embodiment. Each of the plurality of UEs can connect using $3^{rd}$ generation partnership project (3GPP) and non- 3GPP mechanisms. Consider that a particular UE has determined the geo-location of the gNB. The UE can share the determined geo-location of the gNB, along with the cell-identity (Cell-ID), geo-location of neighboring cell gNB, Wi-Fi signage, and radio access technology (RAT) signage, to a cloud 808. A plurality of UEs can send the determined geo-locations of the gNB to the cloud 808, for improving the accuracy of the geo-locations of the gNB by computing the centroid of the geo-locations of the gNB, received from the plurality of UEs.

As illustrated in FIG. 10, a plurality of UEs can send queries to the cloud 808 requesting the geo-location of the gNB, by providing respective signage information pertaining to the UEs to the cloud 808. The signage information can include the at least one of medium access control (MAC) address, Wi-Fi information, Cell-ID, RAT information, and RSRP values, for example. Once the plurality of UEs retrieve the geo-location of the gNB from the cloud 808, the plurality of UEs can reduce their respective beam search space.

The plurality of UEs can retrieve geo-locations of the neighboring cell gNBs for performing neighbor cell search, predicting handovers optimizing neighbor cell signal quality measurements, and performing beam scanning, for example.

The plurality of UEs can store the geo-locations of the gNB and the geo-locations of the neighboring cell gNBs. When the plurality of UEs connects to the same gNBs at some later point in time, the plurality of UEs can use the geo-locations of the gNB and the geo-locations of the neighboring cell gNBs for reducing their respective beam search space.

Figure 11:
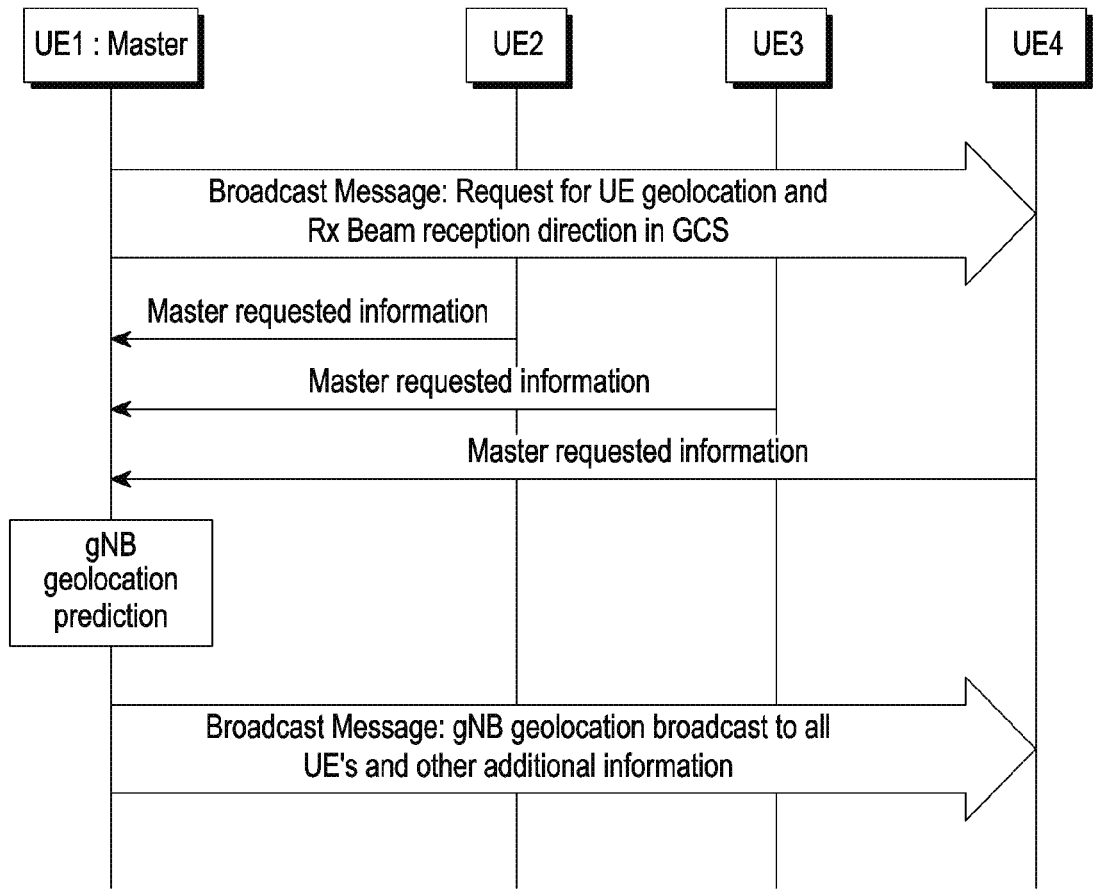
FIG. 11 illustrates a sequence diagram depicting the process of crowdsourcing of geo-location of the gNB, according an embodiment.

FIG. 11 illustrates a sequence diagram depicting the process of crowdsourcing of geo-location of the gNB 807, according an embodiment. In a cell, if a plurality of UEs are connected to the same gNB 807, one UE amongst the plurality of UEs can take a master role, wherein the UE can request the other UEs (labeled as UE 2, UE 3, and UE 4) to provide the respective geo-locations and directions of beam reception in GCS. A UE, which is newly connected to the gNB 807, and initiates the determination of the geo-location of the gNB 807, can assume the master role. Messages between the master UE and the other UEs can be exchanged using the FR1 band.

Each of the plurality of UEs can send their respective current geo-locations and the direction of reception through a beam having the highest RSRP. Based on the received geo-locations of the other UEs and the directions of beam reception, and the geo-location of the master UE at a current time instant, the master UE can determine the geo-location of the gNB 807. The master UE can communicate the geospatial coordinates of the gNB 807 to all the other UEs, i.e., UE 2, UE 3, and UE 4. Thereafter, the other UEs, i.e., UE 2, UE 3, and UE 4 can continue to reduce their beam search space by using the geo-location of the gNB 807.

If any of the other UEs has already determined the geo-location of the gNB 807, the UE can still receive the geo-location of the gNB 807 determined by the master UE, in order to improve the accuracy of the determined geo-location of the gNB 807. The UE can determine the centroid of the geo-location of the gNB 807 determined by the other UE and the geo-location of the gNB 807 determined by the master UE.

The master UE can also request synchronization signal block-IDs (SSB-ID's) that have been tracked by the other UEs. On retrieving the SSB-ID's from the other UEs, the master UE can select frequency-time resources of those SSBs, which would be useful to the other UEs based on the location of the other UEs and information received from the other UEs, thereby enabling the other UEs to save power.

Figure 12A:
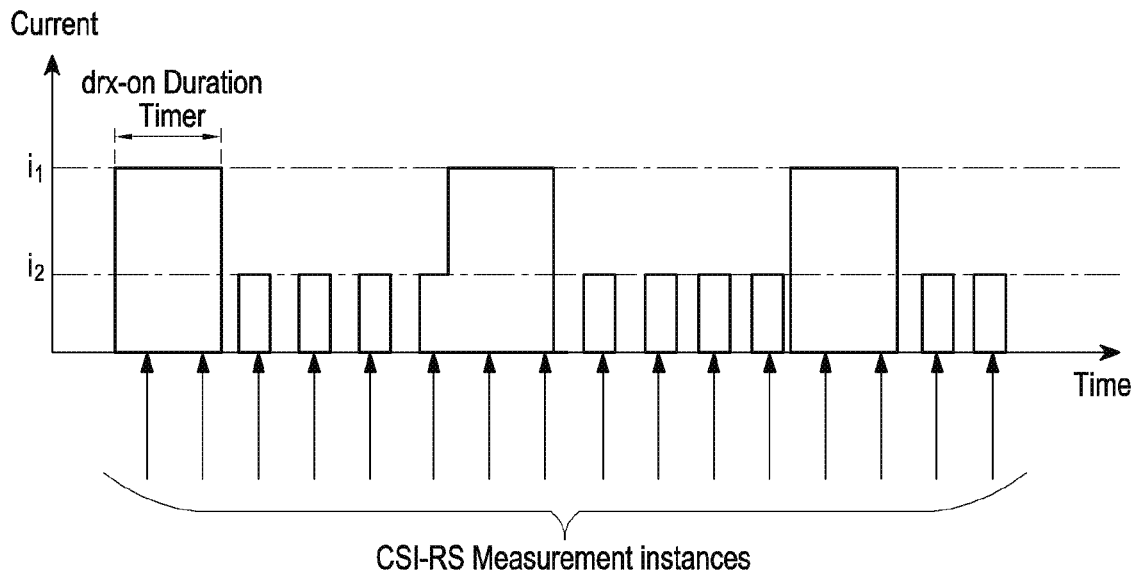
FIGS. 12A and 12B illustrate power consumption profile of the UE and measurement instances scheduled by the UE, according an embodiment.
Figure 12B:
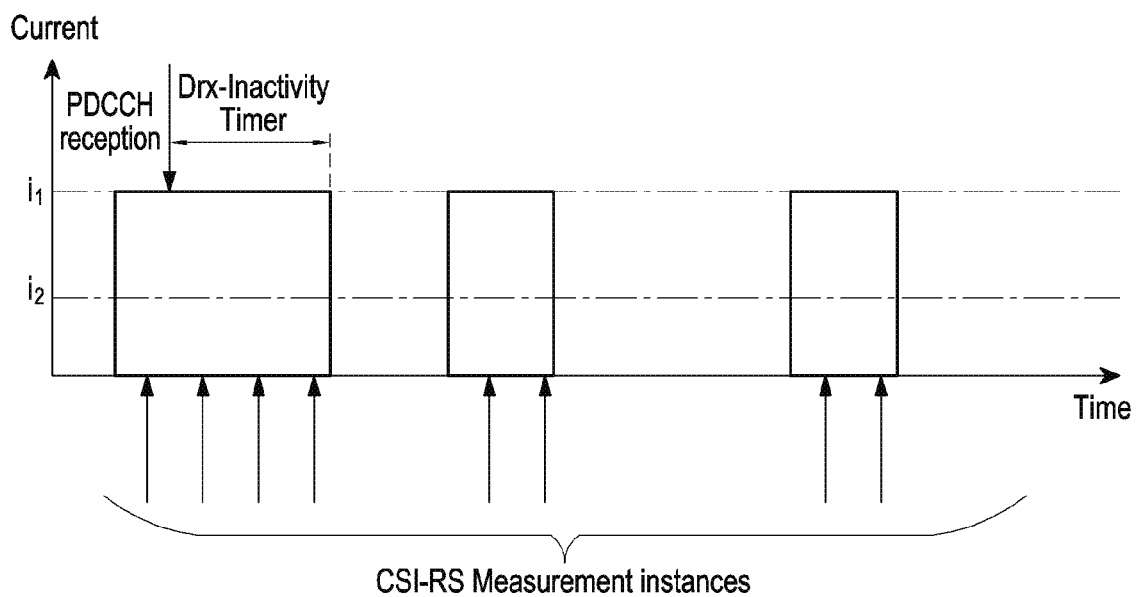

FIGS. 12A and 12B illustrate power consumption profile of the UE 801 and measurement instances scheduled by the UE 801, according an embodiment. The UE 801 can save power by reducing the amount of time that the UE 801 remains in the ON state. The UE 801 can use DRX, wherein the UE 801 periodically switches to the ON state, while remaining in the OFF state for the remainder of the time. DRX can be used for reducing power consumption due to PDCCH monitoring in an RRC CONNECTED state, by monitoring the PDCCH only in the ON state. The CSI-RS resources measurement instances, which lead to power consumption during the OFF state, can be periodic, semi-persistent and aperiodic.

Once the UE 801 has reduced its beam search space, the number of measurements to be performed in a given time period can be reduced. The UE 801 can schedule beam measurements instances during the ON period of the DRX cycle. As the UE 801 needs to measure RSRP of beams in only the beam search space, the UE 801 can schedule beam measurements during the ON period of the DRX cycle, thereby reducing the power consumption.

The UE 801 shall select the measurement instances, which overlap with the instances of PDCCH monitoring (during the ON period of the DRX cycle). If the number of beams in the beam search space is such that all beams in the beam search space can be measured during the ON period of the DRX cycle, the UE 801 can select the measurement instances, which overlap with the instances of PDCCH monitoring. If the number of beams in the beam search space is such that all beams cannot be measured during the ON period of the DRX cycle, then time instances of beam measurement are selected during the OFF period of the DRX cycle, such that transitions are minimized.

If a duration, during which the UE 801 is in the ON state, has increased, due to the inactivity timer (drx-Inactivity-Timer), or retransmission timers such as drx-RetransmissionTimerUL, drx-RetransmissionTimerDL, the UE 801 schedules the measurement instances, which overlap with the ON period of the DRX cycle; and disregards the measurement instances, which have been scheduled in OFF period of the DRX cycle.

If the UE 801 is scheduled to receive PDSCH or if any SSB monitoring and measurement instances are scheduled during the ON period of the DRX cycle, the UE 801 can schedule the beam measurement instances during the ON period of the DRX cycle and refrain from scheduling the beam measurement instances during the OFF period of the DRX cycle.

In an example, consider that the UE 801 has 16 reception beams. The reduced beam search space comprises 8 beams. Therefore, the UE 801 needs to measure only 8 beams, and thus, needs to schedule 8 beam measurement instances.

As illustrated in FIG. 12A, the UE 801 can schedule the measurement instances in the ON period, when the current consumption is $i_1$. If the number of beams in the beam search space is such that all measurement instances cannot be scheduled during the ON period, the UE 801 can schedule measurement instances close to the ON period, considering the possibility that the ON period may get extended due to PDCCH reception. As illustrated in FIG. 12B, due to PDCCH reception, an inactivity timer is triggered, which results in extension of the duration of the ON period.

Figure 13:
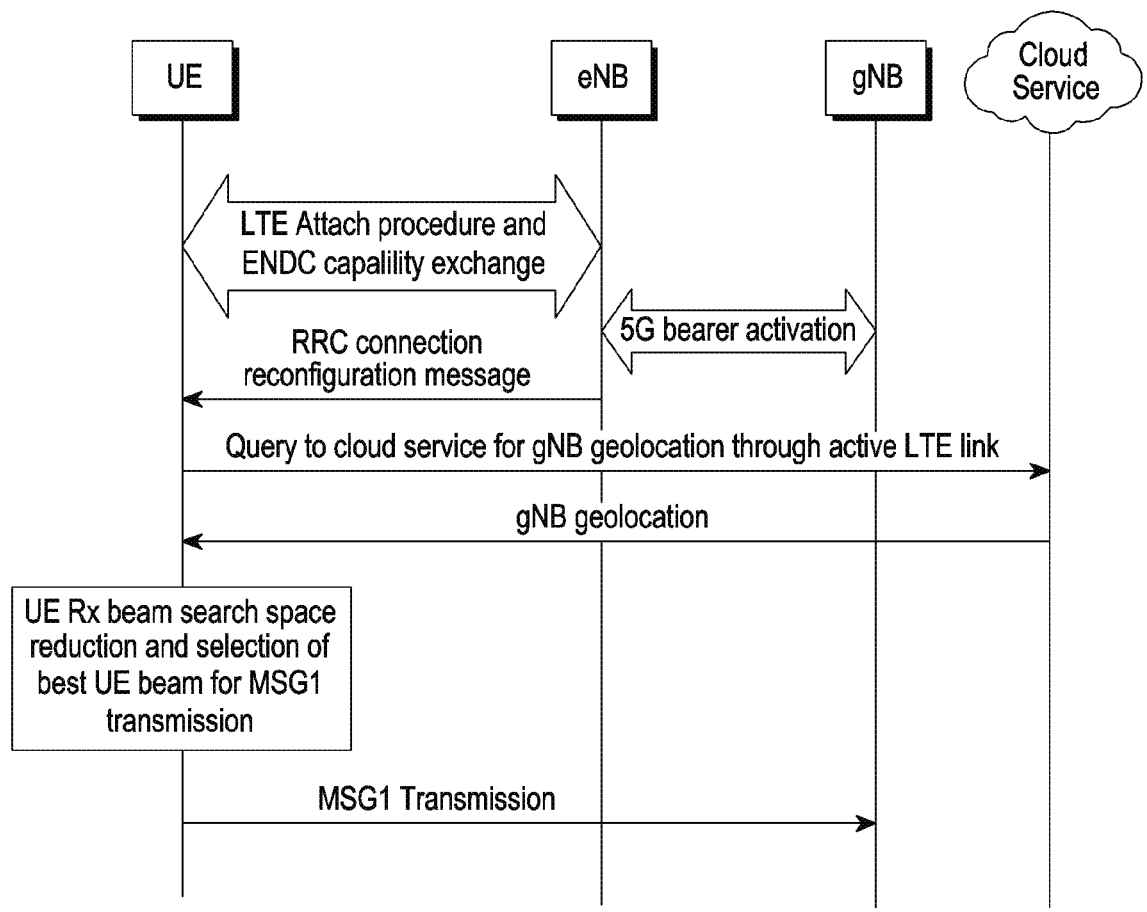
FIG. 13 illustrates a sequence diagram, wherein the UE requests a cloud to provide the geo-location of the gNB, using an LTE connection, according an embodiment.

FIG. 13 illustrates a sequence diagram, wherein the UE 801 requests the cloud 808 to provide the geo-location of the gNB 807, using an LTE connection, according an embodiment. Consider that the UE 801 is operating in the NSA mode. The UE 801 can exchange its evolved-universal mobile telecommunications system (UMTS) terrestrial radio access (E-UTRAN) new radio-dual connectivity (EN-DC) capability with an eNB, during an LTE attach procedure. The UE 801 can receive an RRC connection reconfiguration message from the LTE network for 5G bearer activation. Once the RRC message is received, the UE 801 can access the cloud 807 using the LTE connection.

The UE 801 can request the cloud 808 to provide the geo-location of the gNB 807 by sending a query to the cloud 808. The UE 801 can share the geo-location of the UE 801 and other signature information. The cloud 808 can send the geo-location of the gNB 807 to the UE 801. Once the UE 801 receives the geospatial locations of the gNB 807, the UE 801 shall reduce reception beam search space for reception of SSBs. The UE 801 can determine an optimal beam in the beam search space for performing random access channel (RACH) procedure. Accessing 5 the geo-location of the gNB 807 by requesting the cloud 808 enables a reduction in the time interval between reception of the RRC connection reconfiguration message, from the eNB, and initiation of 5G RACH procedure (MSG 1).

Figure 14A:
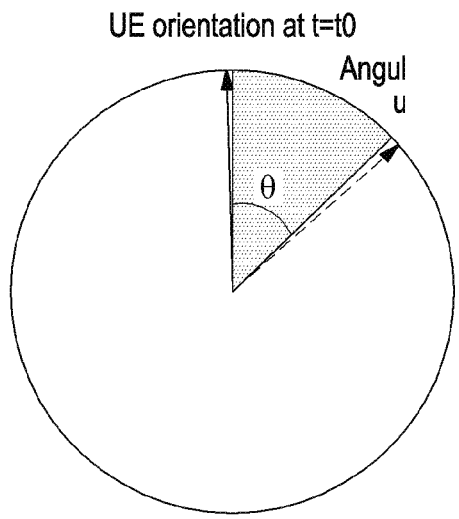
FIGS. 14A, 14B and 14C illustrate beam scheduling, which ensures complete coverage across the entire beam search space for beam measurement, irrespective of changes in an orientation of the UE during beam measurement, according an embodiment.
Figure 14B:
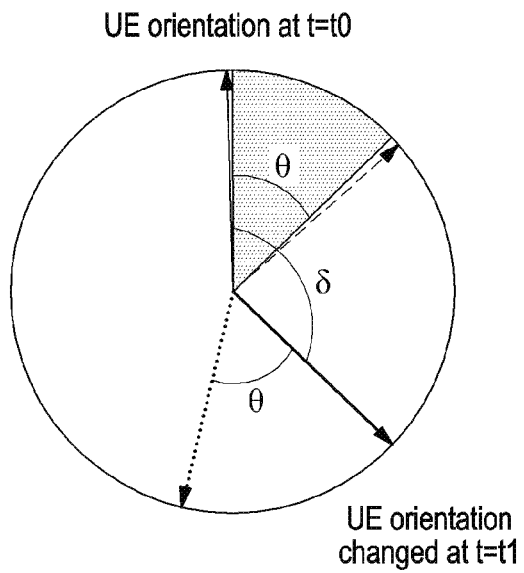
Figure 14C:
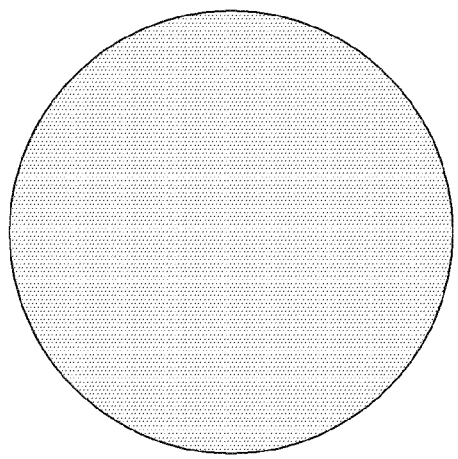

FIGS. 14A, 14B and 14C illustrate beam scheduling, which ensures complete coverage across the entire beam search space for beam measurement, irrespective of changes in an orientation of the UE during beam measurement, according to an embodiment. Consider that the UE 801 has 40 reception beams. For initial access procedures, the UE 801 can perform SSB measurements on all 40 beams. If the SSB burst periodicity is 20 ms, it takes 800 ms to complete beam measurement. Once the beam search space is reduced, the UE 801 performs measurements of a sequence of beams in the beam search space.

If there is a change in the orientation of the UE 801 during beam measurement, then the UE 801 is likely to measure beams in a particular direction more than once and miss measuring beams in another direction. Therefore, the UE 801 can perform beam measurement based on sequences of sequences of GCS directions, rather than sequence of beams. When there is an incoming SSB burst, the UE 801 can select a beam pointing towards the current direction of interest, based on the current orientation.

The UE 801 can perform measurements on beams in the reduced beam search space, which covers an angular portion of sequences of GCS directions. As illustrated in FIG. 14A, consider at time instant t₀, the UE orientation is 0°. By time instant t₁, the UE 801 can perform measurement of beams with an angular coverage between 0° and 0°. As illustrated in FIG. 14B, the UE 801 orientation has changed by δ°. The UE 801 can detect the change in the UE 801 orientation, and select beams pointing towards 0° in GCS and δ-θ° in LCS for beam measurements, rather than selecting the beam pointing towards 0° in LCS. As illustrated in FIG. 14C, full spherical coverage is ensured and none of the beams are measured twice.

The embodiments disclosed herein can be implemented through at least one software program running on at least one hardware device and performing network management functions to control the elements. The network elements shown in FIG. 8 include blocks which can be at least one of a hardware device, or a combination of a hardware device and software module.

The embodiments disclosed herein describe methods and systems for reducing UE beam search space, for determining an optimal beam to receive signals from a gNB. The optimal beam is determined within the reduced beam search space based on a direction of reception of signals at the UE and a geo-location of the gNB. The geo-location is determined based on directions of beam reception at a plurality of time instances and geo-locations of the UE at the plurality of time instances. Therefore, it is understood that the scope of the protection is extended to such a program and in addition to a non-transitory computer readable storage medium having a message therein and a program for implementation of one or more steps of the method, when the program runs on a server or mobile device or any suitable programmable device.

The method is implemented herein through or together with a software program written in, for example, very high speed integrated circuit hardware description language (VHDL) another programming language, or implemented by one or more VHDL or several software modules being executed on at least one hardware device. The hardware device can be any type of portable device that can be programmed. The device may also include means which could be e.g. hardware means like e.g. an application-specific integrated circuit (ASIC), or a combination of hardware and software means, example an ASIC and a field programmable gate array (FPGA), or at least one microprocessor and at least one memory with software modules located therein. The embodiments described herein could be implemented partly in hardware and partly in software, or may be implemented on different hardware devices, e.g. using a plurality of central processing units (CPUs).

While the disclosure has been particularly shown and described with reference to certain embodiments thereof, it will be understood by those skilled in the art that various changes in form and details may be made therein without departing from the scope of the disclosure as defined by the appended claims and their equivalents.

What is claimed is:

1. A method for determining beam search space by a user equipment (UE), the method comprising:
   determining a geo-location of a base station and a geo-location of the UE at a time instance;
   determining a relative angle of reception from the base station based on the geo-location of the base station and the geo-location of the UE at the time instance;
   determining a beam search space comprising a plurality of beams, wherein the determined beam search space is centered at the relative angle of reception; and
   determining an optimal beam from within the beam search space based on the measurement of the plurality of beams in the beam search space,
   wherein the beam search space is limited to an offset angle on either side of the relative angle of reception.

2. The method of claim 1, wherein the geo-location of the base station is determined based on a plurality of geo-locations of the UE at a plurality of time instances and a plurality of directions of reception from the base station at the plurality of time instances.

3. The method of claim 1, wherein the measurement of the plurality of beams, for determining the optimal beam, in the beam search space is scheduled at ON periods of a discontinuous reception (DRX) cycle.

4. The method of claim 1, wherein the measurement of the plurality of beams in the beam search space is scheduled dynamically based on changes in an orientation of the UE.

5. The method of claim 1, further comprising determining a geo-location of a neighboring cell base station based on neighboring cell beam measurement and a plurality of geo-locations of the UE at a plurality of time instances.

6. The method of claim 1, further comprising:
retrieving the geo-location of the base station from a cloud server by sending the geo-locations of the UE at a plurality of time instances and signage information pertaining to the UE to the cloud server; or
retrieving the geo-location of the base station from another UE, connected to the base station, by sending the geo-locations of the UE at the plurality of time instances and signage information pertaining to the UE to the other UE,
wherein the UE connects with the other UE through a new radio (NR) sidelink.

7. The method of claim 1, further comprising computing a centroid of a plurality of determined geo-locations of the base station to determine the geo-location of the base station.

8. The method of claim 1, wherein determining the relative angle of reception comprises:
receiving at least one of a physical downlink control channel (PDCCH) and a physical downlink shared channel (PDSCH) from the base station; and
performing at least one of:
determining the relative angle of reception based on the PDCCH and the relative angle of reception based on the PDSCH, separately; and
determining the angle of reception based on the PDCCH and the angle of reception based on the PDSCH together, thereby determining a combined relative angle of reception for the PDCCH and the PDSCH.

9. The method of claim 1, wherein the relative angle of reception from the base station is determined in at least one of conditions comprising:
detecting a change in the geo-location of the UE;
detecting a beam failure;
periodically determining the relative angle of reception from the base station, wherein a periodicity is pre-configured by at least one of the base station and the UE; and
detecting that no beams in the determined beam search space are optimal.

10. A user equipment (UE) for determining beam search space, the UE comprising:
a communication interface; and
a processor coupled to the communication interface, wherein the processor is configured to:
determine a geo-location of a base station and a geo-location of the UE at a time instance;
determine a relative angle of reception from the base station based on the geo-location of the base station and the geo-location of the UE at the time instance;
determine a beam search space, comprising a plurality of beams, wherein the determined beam search space is centered at the relative angle of reception; and
determine an optimal beam from within the beam search space based on measurement of the plurality of beams in the beam search space,
wherein the beam search space is limited to an offset angle on either side of the relative angle of reception.

11. The UE of claim 10, wherein the geo-location of the base station is determined based on a plurality of geo-locations of the UE at a plurality of time instances and a plurality of directions of reception from the base station at the plurality of time instances.

12. The UE of claim 10, wherein the measurement of the plurality of beams, for determining the optimal beam, in the beam search space is scheduled at ON periods of a discontinuous reception (DRX) cycle.

13. The UE of claim 10, wherein the measurement of the plurality of beams in the beam search space is scheduled dynamically based on changes in an orientation of the UE.

14. The UE of claim 10, wherein the processor is further configured to determine a geo-location of a neighboring cell base station based on neighboring cell beam measurement and a plurality of geo-locations of the UE at a plurality of time instances.

15. The UE of claim 10, wherein the processor is further configured to:
retrieve the geo-location of the base station from a cloud server by sending the geo-locations of the UE at a plurality of time instances and signage information pertaining to the UE to the cloud server; or
retrieving the geo-location of the base station from another UE, connected to the base station, by sending the geo-locations of the UE at the plurality of time instances and signage information pertaining to the UE to the other UE,
wherein the UE connects with the other UE through a new radio (NR) sidelink.

16. The UE of claim 10, wherein the processor is further configured to compute a centroid of a plurality of determined geo-locations of the base station to determine the geo-location of the base station.

17. The UE of claim 10, wherein the processor is configured to determine the relative angle of reception by:
receiving at least one of a physical downlink control channel (PDCCH) and a physical downlink shared channel (PDSCH) from the base station; and
performing at least one of:
determining the relative angle of reception based on the PDCCH and the relative angle of reception based on the PDSCH, separately; and
determining the angle of reception based on the PDCCH and the angle of reception based on the PDSCH together, thereby determining a combined relative angle of reception for the PDCCH and the PDSCH.

18. The UE of claim 10, wherein the relative angle of reception from the base station is determined in at least one of conditions comprising:
detecting a change in the geo-location of the UE;
detecting a beam failure;
periodically determining the relative angle of reception from the base station, wherein the periodicity is pre-configured by at least one of the base station and the UE; and
detecting that no beams in the determined beam search space are optimal.

* * * * *